United States Patent [19]

Burris

[11] Patent Number: 5,539,029

[45] Date of Patent: Jul. 23, 1996

[54] ASPHALT EMULSION-RUBBER PAVING COMPOSITION

[76] Inventor: Michael V. Burris, 5169 Bella Collina St., Oceanside, Calif. 92056

[21] Appl. No.: 389,623

[22] Filed: Feb. 21, 1995

Related U.S. Application Data

[63] Continuation of Ser. No. 212,034, Mar. 11, 1994, abandoned.

[51] Int. Cl.$^6$ ............................. C08L 95/00; C08J 11/06
[52] U.S. Cl. ............................. 524/60; 524/71; 524/59; 521/41; 521/45; 521/44.5
[58] Field of Search .................... 521/40, 40.5, 41, 521/45, 44.5; 524/59, 60, 61, 71

[56] References Cited

U.S. PATENT DOCUMENTS

| | | | |
|---|---|---|---|
| 2,700,655 | 1/1955 | Endres | 524/59 |
| 3,284,397 | 11/1966 | Johnston | 524/60 |
| 3,891,585 | 6/1975 | McDonald | 524/59 |
| 3,900,692 | 8/1975 | Rostler | 524/64 |
| 3,919,148 | 11/1975 | Winters et al. | 524/59 |
| 4,018,730 | 4/1977 | McDonald | 524/60 |
| 4,021,393 | 5/1977 | McDonald | 524/64 |
| 4,041,712 | 8/1977 | Stepien, Jr. et al. | 524/71 |
| 4,069,182 | 1/1978 | McDonald | 524/59 |
| 4,137,204 | 1/1979 | McDonald | 524/71 |
| 4,193,816 | 3/1980 | Ferm et al. | 106/277 |
| 4,548,962 | 10/1985 | Lindmark | 524/59 |
| 4,564,310 | 1/1986 | Thelen et al. | 428/331 |
| 4,609,696 | 9/1986 | Wilkes | 524/59 |
| 4,621,108 | 11/1986 | Burris | 524/71 |
| 5,151,456 | 9/1992 | Elias | 524/60 |
| 5,180,428 | 1/1993 | Koleas | 524/60 |

FOREIGN PATENT DOCUMENTS

| | | | |
|---|---|---|---|
| 0013603 | 1/1991 | Japan | 524/59 |

*Primary Examiner*—Peter A. Szekely
*Attorney, Agent, or Firm*—Jerry R. Seiler

[57] ABSTRACT

A method of preparing an asphalt emulsion-rubber paving composition comprises combining an aqueous asphalt emulsion, water, latex rubber, minus 40 size rubber particles, and a thickening agent, mixing said materials at substantially ambient temperature to form a substantially homogeneous liquid composition, adding to said liquid composition between about 5 and about 15 pounds of aggregate per gallon of said gallon, and mixing the components at substantially ambient temperature to form such paving composition.

6 Claims, No Drawings

ASPHALT EMULSION-RUBBER PAVING COMPOSITION

This application is a continuation of application Ser. No. 08/212,034, filed Mar. 11, 1994 now abandoned.

BACKGROUND OF THE INVENTION

The use of rubber, especially rubber particles such as ground up rubber tires in paving compositions is desirable since the resulting pavements have improved skid resistance and flexibility. Heretofore, such paving compositions, including asphalt-rubber emulsions, have been prepared under hot-mix conditions requiring heating a paving grade asphalt with the particulate rubber. An example of such a method is disclosed in U.S. Pat. No. 4,018,730. However, heating of rubber, typically using old ground up rubber tires at the temperatures heretofore required for blending or mixing with the asphalt compositions, above 300° F., and typically between about 350°–500° F., results in significant volatilization of the rubber components including elemental sulfur which forms highly toxic and undesirable hydrogen sulfide. Such hot-mix processing is undesirable and unacceptable where environmental standards and air pollution controls restrict or prevent the use of such methods.

SUMMARY OF THE INVENTION

The improved asphalt emulsion-rubber paving compositions of the present invention are prepared by mixing together a liquid composition comprising an asphalt emulsion, rubber latex, rubber particles, thickening and/or thixotropic agents and water with aggregate. The liquid asphalt emulsion-rubber composition is produced without the use of heat at any stage of the processing or mixing to achieve a highly desirable emulsion paving composition. The method is carried out entirely at ambient conditions thereby minimizing volatilization of asphalt and rubber components.

DETAILED DESCRIPTION OF THE INVENTION

The paving composition of the present invention comprises an aqueous asphalt-rubber emulsion composition and aggregate. The liquid emulsion composition is first prepared, and thereafter mixed with the aggregate. The asphalt emulsion composition used in preparing the paving composition of the present invention is preferably an emulsion of a penetration grade asphalt having between about 50 and about 75% solids. The penetration grade asphalts have a penetration above about 10 and up to about 300 dmm at 77° F. (25° C.). Preferred asphalt emulsion compositions are of SS type and especially the SS-1h asphalt emulsions, known to those skilled in the art. Such emulsions comprise anionic emulsified asphalts having a viscosity SSF at 77° F. (25° C.) sec. of between about 20 and 100 (ASTM Test D88), with a distillation residue penetration at 77° F. of between about 40 and about 90 dmm (ASTM tests D244 and D5). The preferred SS-1h anionic emulsions are prepared using petroleum sulfonates or sulfates, soap-type emulsifying agents, typically the alkyl metal salts of higher fatty acids including lauric, myristic, palmitic, oleic, ricinoleic, linoleic acids and the like, or mixtures of acids available from animal or vegetable oils. Other examples of anionic emulsifiers are described in my U.S. Pat. No. 4,282,037, the description of which is incorporated herein by reference. A preferred anionic emulsifier comprises a rosin acid soap particularly a Vinsol® resin soap. Alternatively, the asphalt emulsion may be a nonionic emulsifying compositions using emulsifiers including long chain polyoxyethylene or polyoxypropylene groups in fatty acid, alcohol, amide, or amine molecules. These emulsifiers do not ionize but acquire their hydrophilic characteristics from oxygenated side chains, i.e., polyoxyethylene or polyoxypropylene chains combined with the oil-soluble fatty acid, alcohol amine or amide component of the molecule. More specific descriptions of such emulsifiers are also disclosed in my aforesaid U.S. Pat. No. 4,282,037, incorporated herein by reference. The asphalt emulsion composition comprises a major amount of the liquid emulsion composition, preferably 55%–75%, by weight.

The rubber latex material comprises a rubber emulsion or latex in which small globules or particles of natural or synthetic rubber are suspended in water with emulsifying agents. The preferred rubber is styrene-butadiene (SBR), neoprene, or natural rubber. SBR latexes normally have a major amount of rubber present. For example, a commercially available SBR material contains about 68–70% rubber and about 30% water. The SBR rubber may also be crosslinked, for example, with carboxylate groups resulting from treatment with methacrylic acid, or the like. Styrene-butadiene-styrene block copolymers sold under the registered trademarks Kraton® or Hytrel® may be used. Commercially available neoprene latexes have a solids content of about 35%, while a commercially available natural rubber latex has about 60% rubber. Other useful rubbers include acrylic, nitrite, butyl, polyurethanes and silicones, and block copolymers such as styrene-isoprene (SIS) and styrene-ethylene-vinyl acetate (SEVAS). In the latexes, a small amount of emulsifying agent is present which may be cationic, nonionic or anionic. In the preferred SBR latexes, a fatty acid soap is used while in natural rubber natural proteins serve as anionic emulsifiers and stabilizers. Commercially available neoprene latex normally uses nonionic emulsifiers. The amount of rubber latex used in the liquid emulsion is preferably between about 0.5% and about 5%, by weight.

A thickener or thixotropic agent is also used in the liquid emulsion composition to achieve the desired viscosity. Suitable thixotropic agents include polyacrylic resins, carboxyvinyl resins, polyethylene maleic anhydrides, polysaccharides, and the like. The amount of thixotropic agent added is required to adjust viscosity of the final composition to between about 4,000 and about 5,000 centipoise. The amount of thickener used is typically between about 0.2 and about 2%, by weight, of the liquid emulsion composition.

The rubber used in the composition of the invention comprises particulate rubber, especially ground up rubber tires having a particle size of minus 40, U.S. sieve series, i.e., which will pass through a 40 mesh U.S. series sieve. The amount of particulate rubber present in the liquid emulsion composition is that necessary to give a minimum of about 3%, by weight, in the residue. Accordingly, between about 7 and about 10%, weight, in the emulsion composition is preferred.

It may also be desirable to incorporate surface active clay in the liquid emulsion composition, useful as an emulsifying additive or stabilizer for the emulsion composition. Preferred clays comprise sodium bentonite or sodium montmorillonite. When used alone, the bentonite may be used in amounts of up to about 10%, preferably between about 1% and about 8%, by weight, of the liquid emulsion. Other clays having surface active properties may also be used, for example, hydrated aluminum silicate clays, kaolin, kaolinite, halloysite, and prophyllite and the hydrated magnesium silicate clays such as serpentine, chrysotile, and talc.

A small amount of coloring material such as carbon black or graphite fibers is preferably added to give a desirable dark, black color to the final composition. A typical additive of this type comprises a 50% aqueous solids dispersion of carbon black used in the amount of between about 0.10 and about 0.50%, by weight, of the liquid emulsion composition.

In adding and mixing the various components of the composition, a number of different combinations of materials and steps may be utilized within the purview of the invention. For example, water and clay may be mixed alone and allowed to stand for at least a few hours, typically overnight, and thereafter the asphalt emulsion and rubber particles added and mixed, or the aforesaid ingredients may be all combined and mixed together to form a substantially homogeneous liquid composition. However, the water, rubber particles, and clay are preferably first mixed together, with the subsequent addition and mixing of the asphalt emulsion and carbon black. Thereafter, the thickener is added to adjust the viscosity of the liquid emulsion. The latex rubber composition may be added at any convenient time, either with the first group of materials mixed, or later, when desired.

An important aspect of the liquid emulsion composition, prior to the mixture with aggregate, is the ratio of latex rubber:rubber particles. The presence of the rubber latex in the composition is to prevent separation of the rubber particles in the liquid mixture as well as in the final composition. Accordingly, in the preferred embodiment, the latex rubber:rubber particle ratio is between about 1:3 and about 1:5, by weight, respectively.

The components of the liquid emulsion composition are mixed in any suitable way in order to obtain the desired homogeneity, but preferably using a blender, such as a ribbon blender, or the like which gives sufficient agitation and yet full blending of the different components. The amount of water present in the liquid composition is minor, and preferably between about 10 and about 30%, by weight, and more preferably between about 15 and about 25%, by weight. However, the specific amount of water used can be adjusted to achieve the desired consistency, and preferably with the thickener used to give the preferred viscosity of between about 4,000 and about 15,000 cp, and with the aforesaid amount of asphalt emulsion present.

Following preparation of the aforesaid liquid emulsion composition, aggregate is added and thoroughly mixed to obtain the final paving composition material. The aggregate may be any suitable aggregate including crushed rock, recycled glass, sand, graded silica, and the like, commonly used for such applications. The particle size of the aggregate is preferably #16 minus, U.S. Series, (16 mesh) i.e., will pass through a 16 mesh sieve, although for certain applications, larger particles may be used. However, preferably, to obtain the desired consistency, the aggregate materials should be no larger than #8 mesh range. The amount of aggregate used in the final composition is preferably between about 5 and about 15 pounds aggregate per gallon of the liquid composition. The viscosity of the composition changes when aggregate is added. Suitable final paving composition viscosities are between about 8,000 to 30,000 cps depending on gradation of aggregate used.

By way of example, a paving composition was prepared as follows:

Water (19.45%), sodium bentonite clay (3.00%), SS-1h asphalt emulsion (60% solids) (68.00%), carbon black (0.30%) (50% solids dispersion), SBR latex (69% solids) (Ultrapave UP-70®, Goodyear) (1.75%), ground up rubber tires (#40 minus particle size) (7.00%), and sodium polyacrylate thickener (0.50%), 13% solids (Paragum 165®) were mixed at ambient temperature of about 65° F.–75° F. The materials were combined by first mixing the water and clay, allowing the mixture to stand overnight, thereafter adding the asphalt emulsion, latex and rubber tires together with the carbon black. The thickener was added to adjust the viscosity to between 4,000 and 5,000 cps. The resulting composition was mixed in a ribbon blender at about 68° F. until it was substantially homogeneous and thereafter was further mixed at 65°–70° F. in the ribbon blender with #16 minus aggregate in a ratio of 8 pounds of aggregate per gallon of a liquid composition. The aggregate containing composition had a viscosity of about 8,000–10,000 cps. The resulting composition was placed on a road surface as a flex seal slurry on a chip seal, and tested by the California test method to a skid number of between 44 and 46.

I claim:

1. A method of preparing an improved asphalt emulsion-rubber paving composition comprising:

preparing a liquid composition by combining an aqueous asphalt emulsion, water, a thickening agent, latex rubber, and rubber particles of a size passing through a 40 mesh U.S. series sieve, wherein the latex rubber:rubber particle ratio is between about 1:3 and 1:5, by weight, respectively, mixing said components at substantially ambient temperature to form a substantially homogeneous liquid composition, adding to said liquid composition between about 5 and about 15 pounds of aggregate per gallon of said liquid composition, and mixing the components at substantially ambient temperature to form said paving composition.

2. A paving composition prepared by the method of claim 1 wherein the components of said liquid composition comprise:

about 15–25% water, about 50–75% asphalt emulsion, about 1–5% latex rubber, about 3–15% rubber particles, wherein the latex rubber:rubber particle ratio is between about 1:3 and about 1:5, by weight, and about 0.1–2% thickening agent, said amounts being by weight of the liquid composition.

3. A composition of claim 2 wherein said asphalt emulsion comprises between 55% and 75%, by weight of said liquid composition.

4. A composition of claim 2 further comprising between about 1% and about 8% clay, by weight of said liquid composition.

5. A composition of claim 2 further comprising between about 0.1 and 0.5% carbon black, by weight of said liquid composition.

6. The composition of claim 2 wherein the amount of aggregate in said paving composition is between about 5 and about 15 pounds per gallon of said liquid composition.

* * * * *